United States Patent Office 3,133,356
Patented May 19, 1964

3,133,356
GEAR TESTING GAUGE
Edward G. Mercier, West Redding, Conn., assignor to General Precision, Inc., a corporation of Delaware
Filed Apr. 2, 1962, Ser. No. 184,228
4 Claims. (Cl. 33—179.5)

This invention relates to gear testing devices and more particularly to gear testing devices which employ a master or standard gear as a reference and measure the total composite gear error with respect to the calibrated master or standard gear which has a known error.

This basic method of measurement of gear error is old in the art and has been implemented in many different ways as shown by the following United States Patents:

L. O. Carlsen et al., 2,762,220
L. E. Turner, 2,731,728
J. J. Osplack, 2,540,961
W. P. Lotz, 1,445,631
H. G. E. Strelow et al., 2,815,581

Of the above listed patents all but the last are of the pivoted arm type. In this type either the master or the gear being tested is mounted on a pivoted arm and run against the other gear and the deflection of the arm noted. The arm is biased by a spring or weight to provide the correct tooth meshing pressure. Strelow et al. discloses the other type. Here the master gear or test gear is mounted on a movable platform which travels on roller or ball bearings, and the error is determined by measuring the deflection of the platform when the two gears are rolled. Here also a spring or weight may be employed for securing the proper tooth meshing pressure.

In each of the above prior art devices, as exemplified by the cited patent disclosures, the movable holder for mounting one or the other of the gears is subject to frictional forces which increase the inertia of the system and thus reduce the sensitivity and the accuracy of the gear tester. In addition the means for applying the tooth meshing pressure add to and otherwise contribute to increased inertia thus further reducing the accuracy and sensitivity of the prior art gear testers. This is especially aggravated in those testers which employ weights to control the meshing pressure since the entire mass adds to the inertia of the movable mount. It should also be pointed out that an adjustable meshing pressure is a prerequisite of a reliable and versatile tester since gears of different pitch require a different pressure.

One object of this invention is to provide a gear tester of the type described in which the gear mount which provides the error indication has a friction free suspension.

Another object of this invention is to provide a gear tester of the type described above in which the gear mount suspension supplies the proper tooth meshing pressure.

Yet another object is to provide a gear tester as set forth above which is accurate, reliable in operation and inexpensively manufactured.

The invention contemplates a gear tester in which one of the gears is mounted on an elastic medium which permits the gear and the mount to move linearly in a single plane with complete freedom from mechanical friction, thereby substantially decreasing the inertia of the gear mount which in turn makes possible a substantial increase in the sensitivity of the tester.

The foregoing and other objects and advantages of the invention will become more apparent from a consideration of the specification and drawings wherein one embodiment of the invention is described and shown in detail for illustration purposes only.

Figure 1:
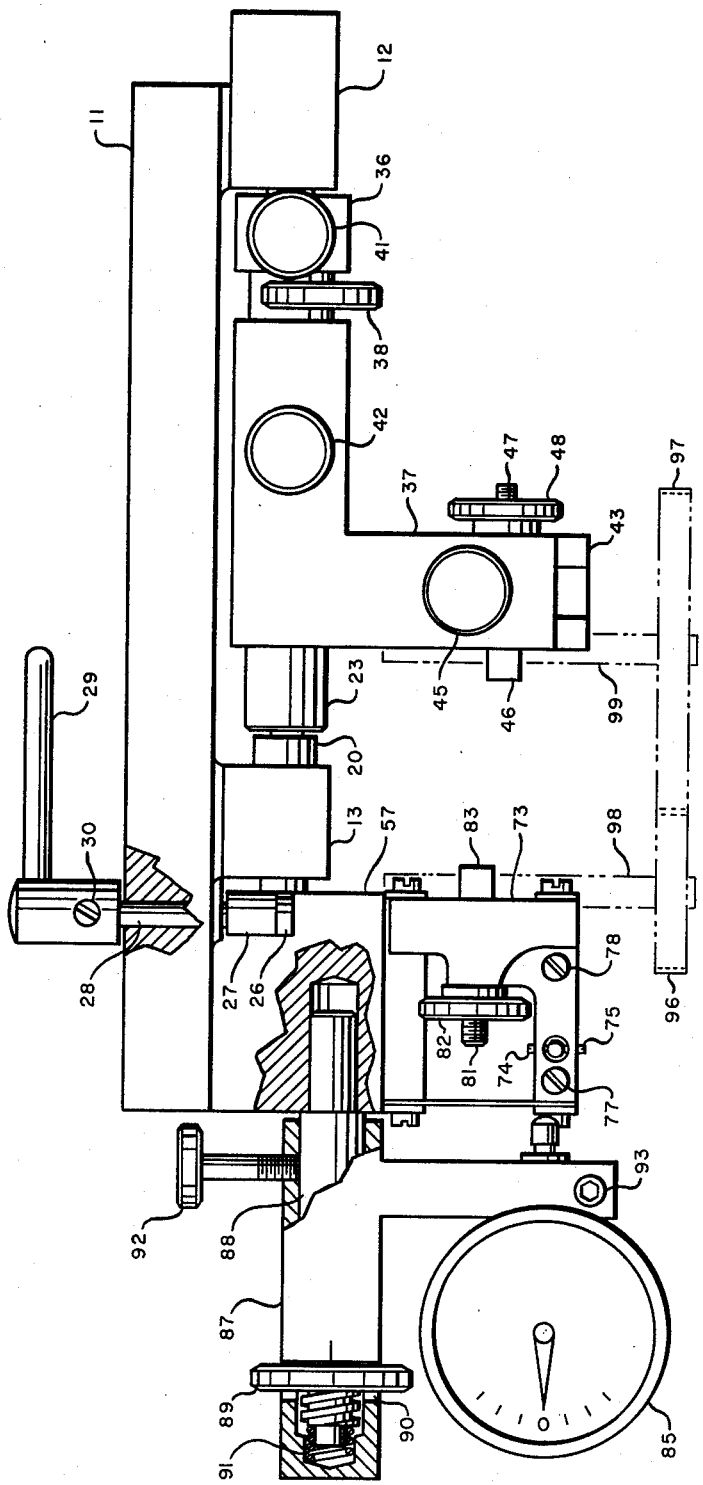
FIGURE 1 is a plan view of a gear testing machine constructed according to the invention.
Figure 2:
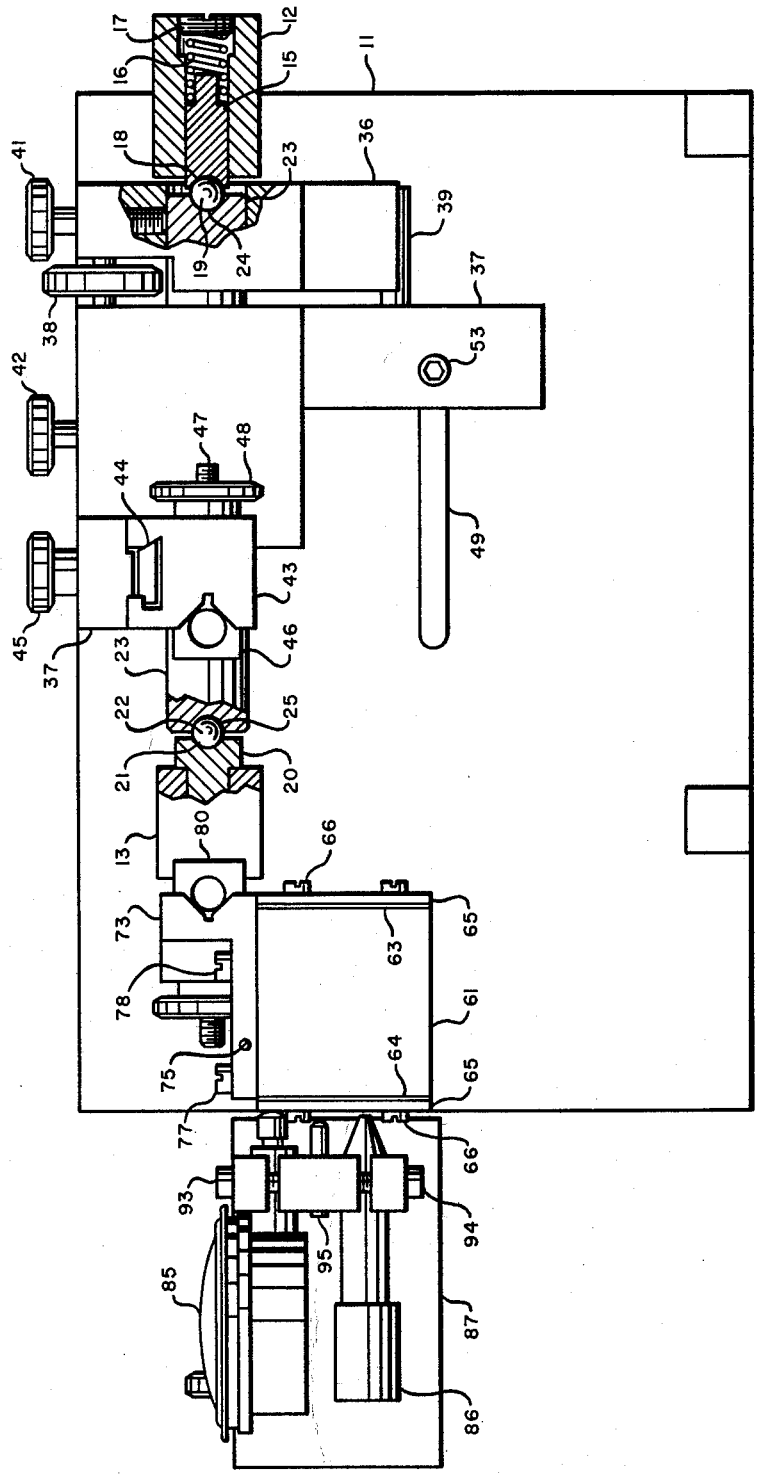
FIGURE 2 is a front elevation of the gear tester.

In the drawings a main frame 11 provides a supporting structure on which the gear tester is constructed. Two bored holders 12 and 13 are attached to frame 11 by screws 14 shown in FIGURE 3 or by any other suitable or convenient fastening devices or combinations thereof. A stub shaft 15, FIGURE 2, is mounted in the bore of holder 12 and engages a wound spring 16 which is retained in the bore by a slotted screw 17. The end of stub shaft 15, remote from spring 16, has a hemispherical socket 18 machined therein for positioning a single ball bearing 19, the function of which will be described later.

Another stub shaft 20 is inserted in the bore of holder 13. This shaft has a dual diameter and the shoulder thus formed limits the movement of the shaft toward the left. The larger diameter portion of the shaft has a hemispherical socket 21 machined therein for retaining a ball 22. Ball bearings 19 and 22 support a main shaft 23 which has a socket 24 at one end engaging ball 19 and a socket 25 at the other end which engages ball 22. Thus the shaft is supported without misalignment between balls 19 and 22 and may be moved laterally to the right against the force exerted by spring 16 when stub shaft 20 is displaced to the right.

Stub shaft 20 extends beyond holder 13 and the smaller diameter portion engages a cam surface 26 on a member 27 which is attached to a shaft 28 passing through frame 11. A handle 29 is attached by a screw 30 to the end of shaft 28 extending from the back side of frame 11. With this arrangement shaft 23 may be displaced to the right by rotating handle 29 since this causes cam surface 26 to urge stub shaft 20, ball 22, main shaft 23, ball 19 and stub shaft 15 to the right. However, when the handle is restored to the position illustrated, spring 16 provides a restoring force to urge the above listed members back to the position illustrated.

A mandrel holding assembly is mounted on main shaft 23 and is provided with both coarse and fine adjusting means to permit movement of the assembly parallel to the axis of shaft 23. This assembly consists of a first member 36 and a second member 37 mounted on shaft 23 and arranged to slide thereon. These members are coupled by a differentially threaded screw 38 which provides the fine adjustment and a stud 39 which is threaded into member 37 and passes through a groove 40 in member 36 for stabilizing member 36 with respect to member 37.

A set screw 41 passes through a threaded hole in member 36 and when rotated clockwise engages shaft 23 to prevent movement of member 36 with respect to shaft 23. Another set screw 42 passes through a threaded hole in member 37 and like screw 41 prevents movement of member 37 with respect to shaft 23. Linear adjustment of the assembly is achieved by loosening set screws 41 and 42 and hand-setting the assembly by sliding it along shaft 23. After a coarse adjustment is made in this manner, set screw 41 is tightened and member 36 locked with respect to shaft 23. Once this is done a fine adjustment is secured by rotating differentially threaded screw 38 which causes member 37 to move along shaft 23. After a satisfactory fine adjustment is made, set screw 42 is tightened and the assembly will remain fixed with respect to shaft 23. The purpose for this adjustment will become quite obvious as the description proceeds.

Figure 3:
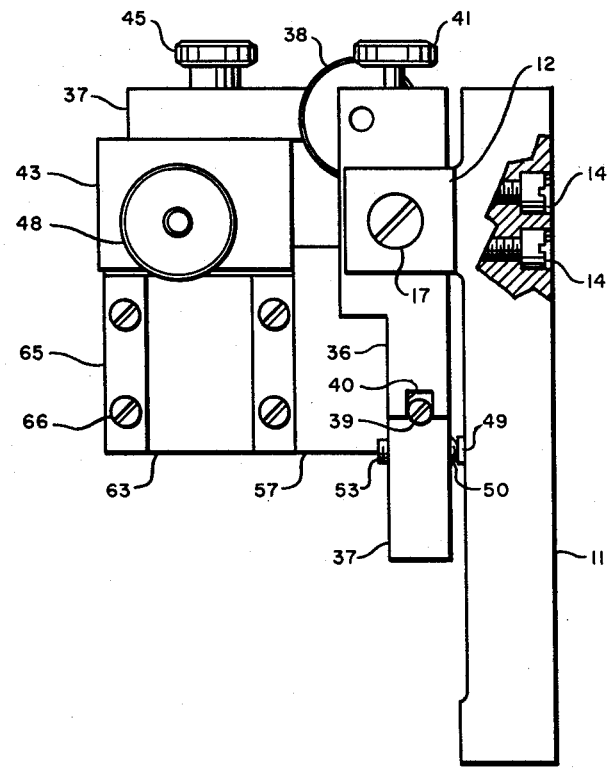
FIGURE 3 is an end view of the gear tester.

A V block 43 is attached to member 37 by a gib key 44 which is tightened by a knurled nut 45. A clamp 46, having a threaded portion 47 extending through V block 43, cooperates with the V grooved portion of the block to hold a mandrel 99 when a knurled nut 48 is tightened. For proper operation the axis of the mandrel when inserted in the V block must be susceptible to adjustment in at least one plane. To this end, as best seen in FIGURE 3, a ground raised surface 49 is provided on frame 11 which cooperates with an adjustable ball bearing 50 which may be moved with respect to member 37 by turning an adjusting screw 53. As adjusting screw 53 is turned the entire movable assembly, including any mandrel inserted as described, will rotate, depending on the sense of the adjustment about the axis of shaft 23. Surface 49 must be ground true with respect to the axis of shaft 23 since the movable assembly must move uniformly over the entire range of adjustment.

Another assembly for holding a second mandrel is located to the left of the assembly previously described. This assembly consists of a mounting block 57 protruding from the front vertical wall of frame 11. The subassembly 58 shown in FIGURE 4 is attached to the front vertical surface of the block 57, by fastening means not shown.

Subassembly 58 has a back and front plate 60 and 61, respectively. Two substantially similar flat springs 63 and 64 join these two plates to form a rectangular structure. The springs are attached to each end of the plates by a clamping bar 65 and two screws 66. The top surface of plate 61 has two threaded holes, 67 and 68, and two plain holes, 69 and 70, extending downwardly. The entire subassembly is, as previously described, attached to block 57 by screws passing through back plate 60 and mating with threaded holes in block 57.

Figure 4:
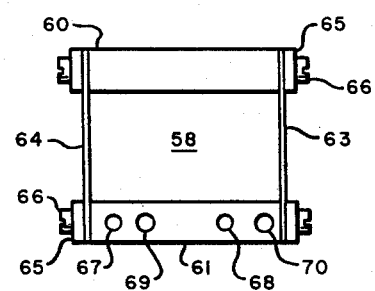
FIGURE 4 is a plan view of the elastic mounting means only.

A second V block 73 is mounted on the top surface of plate 61 as seen in FIGURE 4. The V block 73 has two holes in register with holes 69 and 70. The hole in register with hole 69 in plate 61 is larger and fits loosely around a dowel inserted in hole 69. Another dowel inserted in hole 70 fits into the hole in V block 73 in register therewith to provide a vertical pivot so that the V block can be adjusted in a horizontal plane. A pair of set screws 74 and 75 engage the dowel inserted in hole 69 and permit small adjustments to be made. The V block may be locked in place once the adjustment is made by tightening screws 77 and 78 which are threaded into threaded holes 67 and 68, respectively. It can now be seen that shafts mounted in V block 43 and 73 may have their axes aligned parallel since V block 43 may be rotated in a vertical plane while V block 73 may be rotated in a horizontal plane. Thus, these shafts or mandrels may be properly aligned. V block 73 is provided with a clamp 83 having a threaded portion 81, which is identical to clamp 46 in both structure and function. A nut 82 similar to nut 48 performs the same function as nut 48, however, with respect to clamp 83 and threaded portion 81.

A conventional machinery gage 85 and a conventional air gage 86 are mounted on an L-shaped support 87 which is suspended from mounting block 57 by two dowels, only one of which, 88 is shown.

Dowel 88 is pressed into block 57 which is mounted on frame 11 and is inserted into support 87 with a sliding fit. The end of dowel 88 is threaded and a calibrated adjusting nut 89 mounted on the threaded portion of dowel 88 is located in a notch 90 in support 87. Thus, as the calibrated adjusting nut is turned, it exerts a force on the side of notch 90 causing the support 87 to move one way or the other depending on the direction of rotation of nut 89.

A spring 91 exerts a force between the end of dowel 88 and support 87 which overcomes backlash in the notch 90. A set screw 92 is provided to secure the support against movement once the calibrated nut 89 has been set to provide the proper tooth meshing pressure.

Machinery gage 85 is clamped in a relieved hole in support 87 by a screw 93 and air gage 86 is similarly clamped in another hole immediately below gage 85 by another screw 94. A dowel 95 is inserted in support 87 between the plunger of gage 85 and the tip of gage 86 to limit the movement of V block 73. This protects both gages from damage due to excessive movement. In addition it prevents excessive flexing of springs 63 and 64 and their consequent deformation. The plunger of gage 85 engages clamping bar 65 and follows the perturbations between the two gears mounted on mandrels retained in V blocks 43 and 73.

A master gear 96 and a test gear 97 shown in dotted line are mounted on mandrels 98 and 99, respectively, which are also shown in dotted line.

Calibrated nut 89 has markings thereon in ounces to indicate the pressure applied to the mating gear teeth by springs 63 and 64 and in order to select the desired pressure, the number corresponding to that pressure must be set opposite a scribed mark on support 87. While nut 89 is calibrated in units of force its function is to control the separation between the indicator body 85, its support 87, and springs 63 and 64. After the correct spacing, calibrated in ounces, is obtained by adjusting nut 89 support 87 is locked by set screw 92. Member 37 is then adjusted to deflect springs 63 and 64 until a zero reading is obtained on indicator 85. The deflection of springs 63 and 64 supplies the mating pressure due to the restoring force transmitted via mandrel 98 to gear 96. Since the restoring force thus exerted is a function of the displacement of springs 63 and 64 nut 89 may be directly calibrated in units of force as will be described in greater detail below.

Calibration of the nut is accomplished by applying a known weight or force to a mandrel mounted in V block 73 which deflects the V block toward the left and then turning nut 89 to secure a preselected indication, in this instance zero on gage 85. A mark is then placed on the nut opposite the said scribed mark on support 87 indicating the weight or force applied.

This procedure is repeated until all of the desired weights or forces have been calibrated. It should be pointed out that the pitch of the thread used on the end of dowel 88 should be so selected as to utilize one full turn for the range of weights or forces desired in order to secure the maximum resolution for the device.

It is customary in gear testers to provide automatic means for rolling the gears. However, since these devices are well known, none have been disclosed. In addition, the gears may be rolled together by hand and satisfactory results achieved.

In operation, mandrels of the proper sizes are clamped in V blocks 43 and 73 and the master and test gear mounted. It makes no difference which gear is mounted on the mandrels since the same results are obtained with either mounting arrangement.

After the gears are mounted, the correct pressure is set on nut 89 and support 87 is locked by tightening set screw 92. A coarse adjustment of the gears is then made by sliding V block 43 and the gear mounted on it toward and into mesh with the gear mounted on V block 73. When the dial indicator on gage 85 is close to zero, set screw 41 is tightened to lock member 36. A fine adjustment is now made by turning differentially threaded screw 38 till the gage needle reads zero and then locking V block 43 by tightening set screw 42. The gears may now be rolled by hand or by an electric motor and pinion and the deviation from zero gage reading recorded which deviation provides the total composite error in the gear being tested with respect to the known master gear.

If a number of similar gears are to be tested in succession, handle 29 may be rotated to take the gears out of mesh and another may then be readily substituted for the one just tested. Once the new gear is mounted on the mandrel, handle 29 is restored and the gears again mesh with the proper centers and pressure. This quick change device permits the testing of similar gears with a minimum of adjustment.

The device described may without modification be utilized as a comparator. If put to this use the gage should be set to zero at the appropriate pressure with a master block of known size. Thereafter the test piece may be substituted for the known master and the deviation recorded.

What is claimed is:

1. A gear tester for determining the total composite error present in one gear with respect to another comprising, elastic gear supporting means for providing bidirectional linear movement of a gear supported thereon, in a single plane when subjected to a force having a component parallel to the said linear direction, gear supporting means for supporting a gear in running alignment with a gear supported on the elastic gear support, said gear supporting means being adjustably arranged so that the spacing between the elastic gear support and the gear support is continuously and adjustably variable between first and second limit positions, means for supporting a linear deflection detector, said detector support means being adjustably arranged so that the spacing between the detector support and the elastic gear support means is continuously and adjustably variable to any set position between a third and fourth limit position whereby the meshing pressure between the teeth of gears mounted on the elastic gear support means and the gear support means is a function of the said set position of the detector support between the third and fourth limit positions when the elastic gear support is displaced by adjustment of the gear support means to secure a predetermined deflection of a linear deflection detector mounted on the detector support means.

2. A gear tester as set forth in claim 1 in which the elastic gear supporting means includes,
   a fixed frame,
   a mandrel holder, and
   two parallel flat springs each having one end rigidly attached to said frame and their other ends rigidly attached to said mandrel holder.

3. A gear tester for determining the total composite error in one gear with respect to another comprising,
   a frame,
   an elastic gear support mounted on said frame for providing bidirectional linear movement in a predetermined direction of a first gear mounted thereon, when deflected by a force having a component parallel to the said direction,
   an adjustable gear support mounted on said frame for supporting a second gear, said adjustable support being linearly adjustable for bringing said second gear into engagement with said first gear against the urging of said elastic gear support,
   a linear deflection detector,
   a holder for supporting said linear deflection detector mounted on said frame said holder being adjustably arranged so that the spacing between the detector and the undeflected position of said elastic gear support is continuously and adjustably variable, within a preselected range, to any preselected spacing whereby the meshing pressure between the teeth of the first and second gears is a function of the said preselected spacing whenever the elastic gear support is deflected to secure a predetermined displacement of said deflection detector by an adjustment of the adjustable gear support.

4. A gear tester as set forth in claim 3 in which the elastic gear support includes,
   a mandrel holder, and
   two parallel flat springs each having one end rigidly attached to said frame and their other ends rigidly attached to said mandrel holder.

References Cited in the file of this patent

UNITED STATES PATENTS

| 2,447,445 | Widen | Aug. 17, 1948 |
| 2,731,728 | Turner | Jan. 24, 1956 |

FOREIGN PATENTS

| 904,128 | Germany | Feb. 15, 1954 |